US012767278B2

(12) United States Patent
Smith

(10) Patent No.: US 12,767,278 B2
(45) Date of Patent: Oct. 20, 2026

(54) MARINE MOORING AND ELECTRICAL CONNECTION APPARATUS AND METHOD

(71) Applicant: Jebb Smith Limited, Aberdeen (GB)

(72) Inventor: George Smith, Aberdeen (GB)

(73) Assignee: Oasis Marine Ltd., Aberdeen (GB)

( * ) Notice: Subject to any disclaimer, the term of this patent is extended or adjusted under 35 U.S.C. 154(b) by 613 days.

(21) Appl. No.: 18/033,230

(22) PCT Filed: Oct. 20, 2021

(86) PCT No.: PCT/GB2021/052720
§ 371 (c)(1),
(2) Date: Apr. 21, 2023

(87) PCT Pub. No.: WO2022/084675
PCT Pub. Date: Apr. 28, 2022

(65) Prior Publication Data

US 2023/0399078 A1 Dec. 14, 2023

(30) Foreign Application Priority Data

Oct. 21, 2020 (GB) ..................................... 2016724

(51) Int. Cl.
*B63B 22/02* (2006.01)
*B63B 21/50* (2006.01)
(Continued)

(52) U.S. Cl.
CPC .............. *B63B 22/02* (2013.01); *B63B 21/50* (2013.01); *B63B 27/30* (2013.01); *H02G 9/12* (2013.01); *H02G 11/003* (2013.01)

(58) Field of Classification Search
CPC ......... B63B 22/02; B63B 21/50; B63B 27/30; H02G 9/12; H02G 11/003
See application file for complete search history.

(56) References Cited

U.S. PATENT DOCUMENTS 3,939,509 A * 2/1976 Moore .................... B63B 22/00 441/30
4,648,848 A * 3/1987 Busch ................... E21B 17/015 441/3
2010/0227517 A1* 9/2010 Bailey ..................... B63B 22/02 441/3

FOREIGN PATENT DOCUMENTS

EP 2143630 A1 1/2010
EP 3892529 A1 10/2021
(Continued)

OTHER PUBLICATIONS

Written Opinion and International Search Report for PCT/GB2021/052720 dated Feb. 18, 2022, 7 pages.

*Primary Examiner* — Stephen P Avila
(74) *Attorney, Agent, or Firm* — Faegre Drinker Biddle & Reath LLP

(57) ABSTRACT

A marine environment electrical connection apparatus including a buoy apparatus is provided at least part of which when located in water projects above the surface of the water. It includes at least one mooring point which includes a mooring line and at least one electrical power coupling to which a marine vessel can be coupled so that electrical power can be transferred via the electrical power coupling between a power generation and/or storage device (such as that provided by an offshore renewable energy source) and the marine vessel. A method of electrically recharging a marine vessel utilising the apparatus is also provided.

28 Claims, 9 Drawing Sheets

(51) Int. Cl.

| | |
|---|---|
| ***B63B 27/30*** | (2006.01) |
| ***H02G 9/12*** | (2006.01) |
| ***H02G 11/00*** | (2006.01) |

(56) References Cited

FOREIGN PATENT DOCUMENTS

| | | | |
|---|---|---|---|
| FR | 2219053 | A1 | 9/1974 |
| WO | 2021104588 | A1 | 6/2021 |

* cited by examiner

MARINE MOORING AND ELECTRICAL CONNECTION APPARATUS AND METHOD

FIELD OF THE INVENTION

The present invention relates to a marine mooring and electrical connection apparatus and method and more particularly, but not exclusively relates to a buoyant electrical power mooring buoy to which electrical sea or ocean going vessels (which could be hybrid or fully electric powered vessels) can moor to/be moored to and also electrically couple to in order to have their onboard batteries recharged.

BACKGROUND TO THE INVENTION

Traditionally, marine vessels have been mainly powered by hydrocarbon fossil fuel such as coal and in recent decades oil (and to a lesser extent gas). However, more recently, marine vessels including ocean, sea and river going vessels are starting to transfer away from hydrocarbon propulsion systems to either:— a) hybrid electric and hydrocarbon fuel systems; or b) fully electric systems.

One of the key challenges for this transition is the capacity of the marine vessel's battery storage which limits the range of such hybrid or fully electric marine vessels.

Such hybrid and fully electric marine vessels are typically connected to a suitable onshore power supply in order to recharge their batteries whilst moored in a harbour prior to sailing out offshore whilst on work. However, hitherto, recharging the batteries of such hybrid or fully electric marine vessels whilst away from land harbours is much more challenging, but access to offshore recharging, if a suitable recharging system were provided, would greatly extend the range and viability of these vessels and thus such a marine environment electrical connection apparatus and method to enable such recharging would be highly beneficial and advantageous. Moreover, the provision of such a marine environment electrical connection apparatus and method would greatly accelerate the rollout of such hybrid or fully electric marine vessels and thus would greatly benefit the decarbonisation of the entire marine vessel fleet.

It is an aim of the present invention to provide a solution to solve at least one (and more preferably some or more preferably many of) the aforementioned problems and in doing so, in preferred embodiments only, to provide a mooring buoy to which a vessel can moor at sea, wherein the buoy also contains an electrical connection point to which the vessel can connect and receive electrical power for the recharging of its batteries and other uses.

SUMMARY OF THE INVENTION

According to a first aspect of the present invention there is provided a marine environment electrical connection apparatus comprising:—

- a buoy at least part of which when located in water projects above the surface of the water;
- at least one mooring point to which a marine vessel can be coupled; and
- at least one electrical power coupling to which the marine vessel can be coupled,
- such that electrical power can be transferred via the electrical power coupling between a power generation and/or storage device and the marine vessel.

According to a second aspect of the present invention, there is provided a method of electrically recharging a marine vessel, the method comprising the steps of:—

- connecting a marine vessel to a marine environment electrical connection apparatus in accordance with the first aspect; and
- transferring electrical power via the electrical power coupling between a marine power generation and/or marine storage device and the marine vessel.

Preferably, the marine vessel is provided with an electrical power storage means such as batteries and more preferably, electrical power can be transferred via the electrical power coupling between a marine power generation and/or marine storage device and the electrical power storage means provided on the marine vessel.

Typically, the marine vessel can be one of directly and indirectly coupled to the mooring.

Typically, the marine vessel can be one of directly and indirectly coupled to the electrical power coupling.

Preferably, the at least one mooring point comprises a mooring line, one end of which may be secured to the buoy and the other end of which may be secured to the marine vessel. More preferably, a connection means is provide on, at or in close proximity to said other end to enable connection to a vessel mooring line. Most preferably, said connection means comprise one or more hooks which in use can capture the vessel mooring line, and which may allow an operator to pull upon the vessel mooring line in order to pull the said mooring line aboard the vessel.

Preferably, the said electrical power coupling comprises an electrical cable and more preferably comprises a flexible electrical cable, one end of which may be secured to the buoy and the other end of which may be secured to a suitable electrical connector provided on the marine vessel and which is in electrical coupling with the batteries provided aboard the marine vessel. More preferably, the flexible electrical cable comprises one of a plug and a socket at its said other end and which is adapted for connection with a suitable shaped other of a plug and socket electrically coupled to the marine vessel batteries.

Preferably, the flexible electrical cable is secured to the said mooring line at least at one location along its length and more preferably at its said other end such that the mooring line bears the majority of the tension experienced when the marine vessel is moored to the buoy.

Preferably, the buoy comprises a body which may be in the form of a spine such as a tubular spine and more preferably further comprises a flotation member in the form of buoyant material provided on an outer surface of the body and more preferably comprises buoyant material provided on an outer surface of the tubular spine at least part way or more preferably at least along a majority of the longitudinal length of the tubular spine and most preferably around the entire outer circumference along a majority of the longitudinal length of the tubular spine. More preferably, the buoyant material is adapted to assist in flotation of the buoy such that at least a portion of the buoy projects out of the water in use. More preferably, the buoy is arranged such that the said other end of at least one of the mooring line and the electrical cable is arranged to project out of the water in use of the buoy.

Typically, said other end of the mooring line is available to be picked up by an operator of a marine vessel from a pick up position, such that the operator can make the said other end fast to the vessel in use in order to moor the vessel. Preferably, the pick up position of the said other end of the mooring line is above the water level, in use.

Preferably, the body is adapted to pay the mooring line and the flexible electrical cable away from and toward a portion (and preferably an uppermost portion) of the body, and more preferably pay the mooring line and the flexible electrical cable in and out from the body, such that the buoy apparatus is transformable between:— a rest configuration in which the respective free ends of the mooring line and the flexible electrical cable are relatively close to the body and are preferably presented in a position that is clear of the water, in use; and a deployed configuration in which the respective free ends of the mooring line and the flexible electrical cable are payed out from the body such that the respective free ends are capable of being made fast to the vessel.

Typically, the distance between the said respective free ends of the mooring line and the flexible electrical cable and the said body when in the deployed configuration is greater than when in the rest configuration.

Typically, the said respective free (other) ends of the mooring line and the flexible electrical cable are available to be picked up by an operator of a vessel from a pick up position, such that the operator can then make the said other ends fast to the vessel in use in order to both moor and electrically connect the vessel to the buoy, and in such circumstances the buoy apparatus has transformed from the rest configuration to the deployed (mooring and electrically connected) configuration.

Preferably, the mooring line and the flexible electrical cable are jointly biased into the rest configuration by a biasing means and more preferably, the biasing means comprises a biasing device. Preferably, the biasing device comprises a mass member which is typically a travelling mass member.

Preferably, the body comprises an elongate tubular body and more preferably, the elongate tubular body comprises a hollow tubular member having a longitudinal axis which in use and, when under no or minimal load, is adapted to extend substantially vertically, typically in a direction substantially perpendicular to the plane of the surface of the body of the water. Preferably, the tubular body is arranged such that in use, a first (lower) portion of the tubular body is arranged to be submerged in the body of the water and the second (upper) portion of the tubular body is arranged to project upwardly from the body of the water such that it is arranged to project into the air above the surface of the body of the water.

Optionally, the body is adapted to contain a greater length of the mooring line and the flexible electrical cable than the length of the hollow tubular member when the buoy apparatus is in the rest configuration and more preferably is adapted to contain a length of the mooring line and the flexible electrical cable that is a multiple of the length of the hollow tubular member when the buoy apparatus is in the rest configuration.

Preferably, the said respective one end of the mooring line and the flexible electrical cable are secured to the tubular body and more preferably a respective middle portion of the mooring line and the flexible electrical cable are arranged around the outer circumference of the said travelling mass member, and more preferably, the moveable mass member is located within the internal bore of the tubular body and even more preferably, the moveable mass member jointly pulls the said middle portion of the mooring line and the flexible electrical cable towards the rest configuration by virtue of gravity acting upon the moveable mass member to bias the moveable mass member to the lower in use end of the tubular body and therefore to bias the respective said other ends of the mooring line and the flexible electrical cable towards or retain it in the pick up position.

Preferably, the tubular body further comprises an attachment point, typically provided at the in use lower most end of the tubular body which in use is below the water surface, where the attachment point provides for the attachment of a restraint to connect the buoy apparatus to the sea bed and therefore in use moor the buoy to the sea bed and furthermore if a marine vessel is moored to the buoy, to indirectly moor the marine vessel to the sea bed.

Preferably, the marine vessel further comprises a control system for controlling the recharging of the electrical power storage means such as the batteries located on the marine vessel. Typically, the buoy further comprises one or more sensors adapted to communicate to the control system on the marine vessel when the said electrical connector of the flexible electrical cable is in electrical connection with the suitable electrical connector provided on the marine vessel. Typically, once the control system has received a signal from the said one or more sensors, the control system is capable of energising the electrical power supply to the batteries of the marine vessel via the said flexible electrical cable.

Preferably, the flexible electrical cable is secured at or towards the upper end of the body to allow for a length of flexible electrical cable approximate to twice the travelable distance of the travelling mass member to be pulled out of an uppermost end of the buoy.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as “including”, “comprising”, “having”, “containing” or “involving” and variations thereof, is intended to be broad and encompass the subject matter listed thereafter, equivalents, and additional subject matter not recited, and is not intended to exclude other additives, components, integers or steps. Likewise, the term “comprising” is considered synonymous with the terms “including” or “containing” for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase “comprising”, it is understood that we also contemplate the same composition, element or group of elements with transitional phrases “consisting essentially of”, “consisting”, “selected from the group of consisting of”, “including” or “is” preceding the recitation of the composition, element or group of elements and vice versa.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention. Additionally, any feature disclosed in the specification can be combined alone or collectively with other features in the specification to form an invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention.

All numerical values in this disclosure are understood as being modified by "about". All singular forms of elements, or any other components described herein including (without limitations) components of the apparatus to collect cuttings are understood to include plural forms thereof and vice versa.

BRIEF INTRODUCTION TO THE DRAWINGS

Embodiments of the present invention will now be described, by way of example only, with reference to the accompanying drawings, in which:—

FIG. 1 is a general schematic arrangement of a first embodiment of a marine environment electrical connection apparatus in accordance with the present invention and in the preferred form of a power buoy, with a suitable marine vessel moored to the power buoy and also in electrical coupling connection with the power buoy, in order to enable charging/recharging of the electrical power storage means such as batteries located on the marine vessel;

Figure 14:
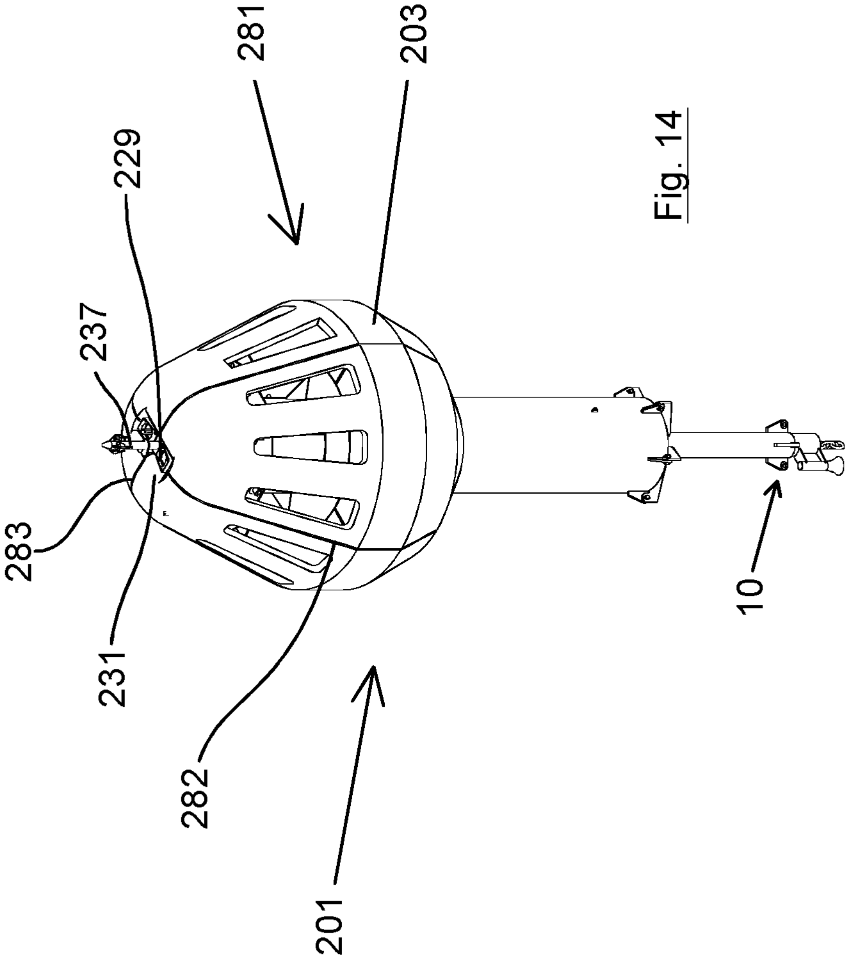
FIG. 14 is a perspective view of a third embodiment of a power buoy which can be used instead of or in addition to the power buoy of FIG. 2 and/or or the power buoy of FIG. 11, prior to a suitable marine vessel being moored/electrically coupled thereto.
Figure 15:
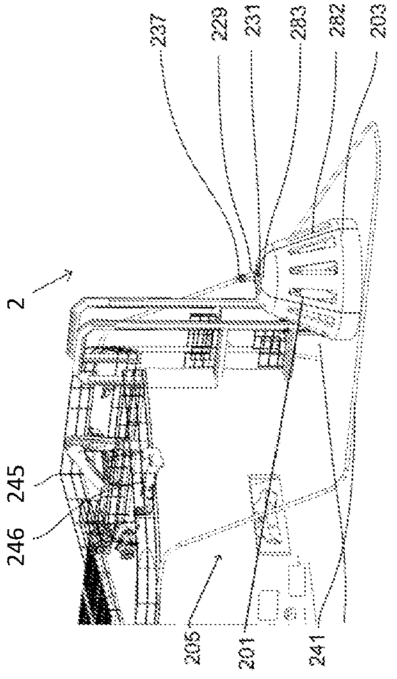
Figure 16:
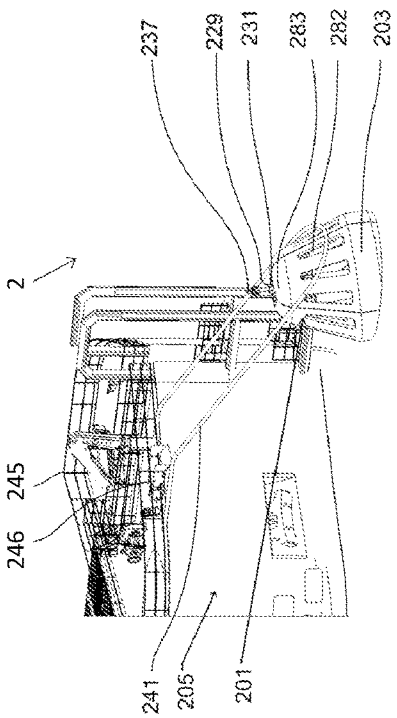
Figure 17:
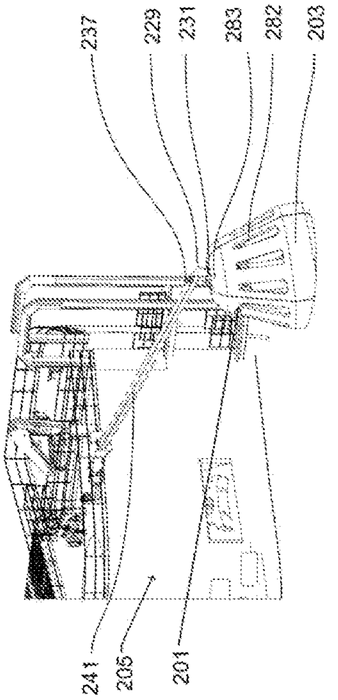
Figure 18:
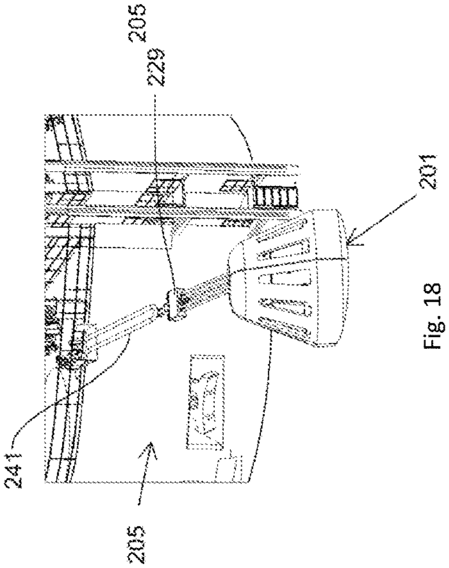
Figure 19:
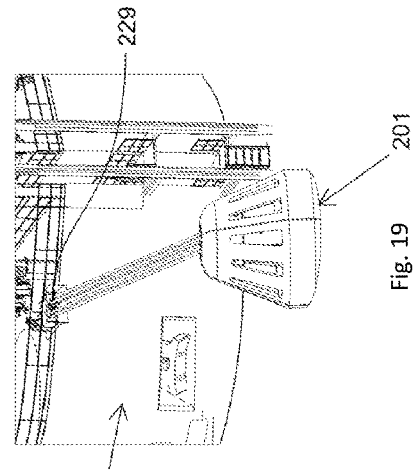

FIG. 15 is a first stage of a method of connecting a vessel mooring line to a suitable marine vessel (in order to electrically recharge the marine vessel), where FIG. 15 shows a view of the mooring crane operated by an operator aboard a suitable marine vessel (typically a relatively large vessel such as an offshore supply vessel or tanker etc.) in close proximity to the power buoy of FIG. 14 and the power buoy of FIG. 14 being surrounded by a bight of the vessel mooring line (and therefore shows the start of the method of mooring and electrically coupling the marine vessel to the power buoy of FIG. 14);

FIG. 16 shows the next stage of the method of connecting the marine vessel to the power buoy on from the previous stage shown in FIG. 15, where the vessel mooring line is pulled in by a windlass and is riding up the body of the buoy;

FIG. 17 shows the next stage (of the mooring and electrical connection of a suitable marine vessel to the power buoy) on from the previous stage shown in FIG. 16, where the vessel mooring line has attached to the power head spear of the power buoy and has been pulled taught by the crane on the suitable marine vessel, but prior to the operator pulling the power head spear and thus the power socket aboard the suitable marine vessel;

FIG. 18 shows the next stage (of the mooring and electrical connection of a suitable marine vessel to the power buoy) on from the previous stage shown in FIG. 17, where the windlass is pulling the power head spear and thus the power socket towards the suitable marine vessel; and FIG. 19 shows the next stage (of the mooring and electrical connection of a suitable marine vessel to the power buoy) on from the previous stage shown in FIG. 18, where the power socket is pulled aboard the suitable marine vessel and the connection between the power socket and the suitable marine vessel has been made.

DETAILED DESCRIPTION OF THE DRAWINGS

Figure 1:
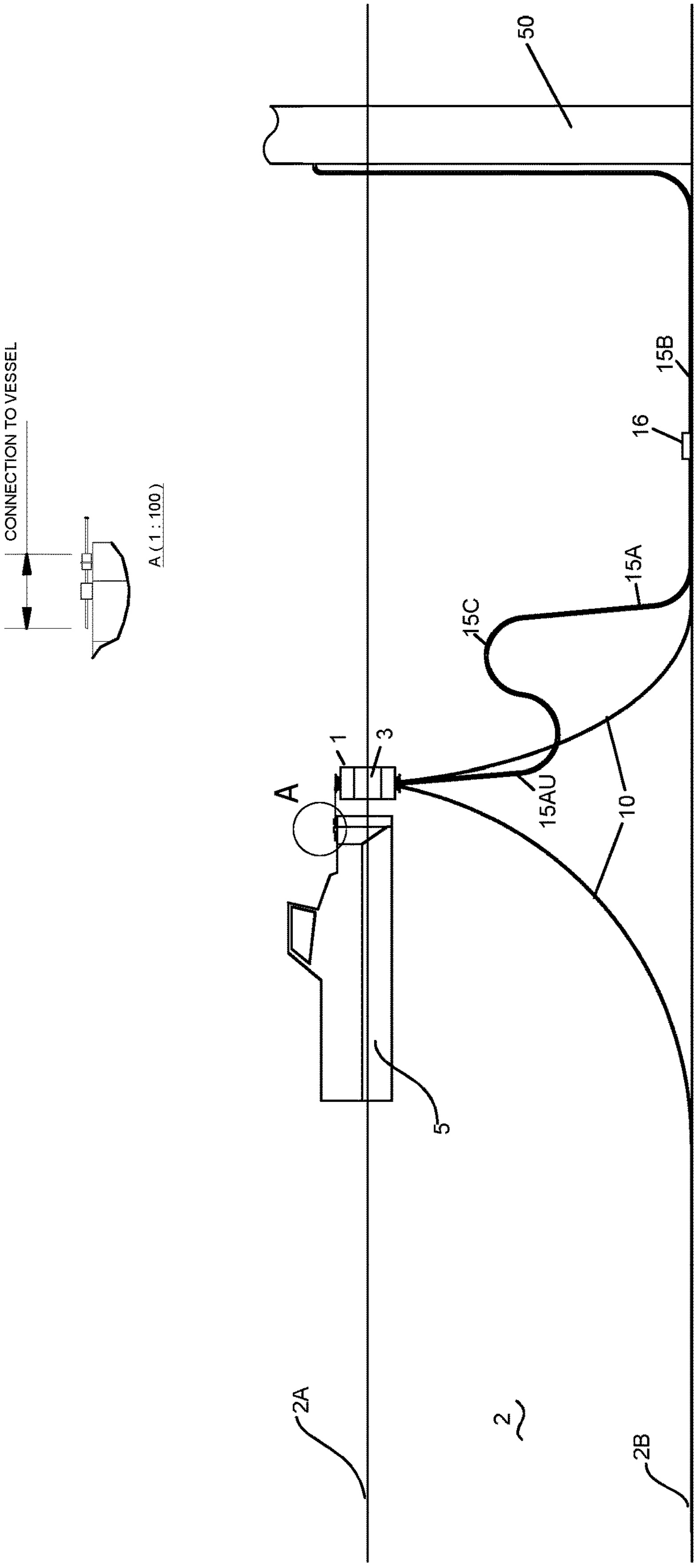
Figure 2:
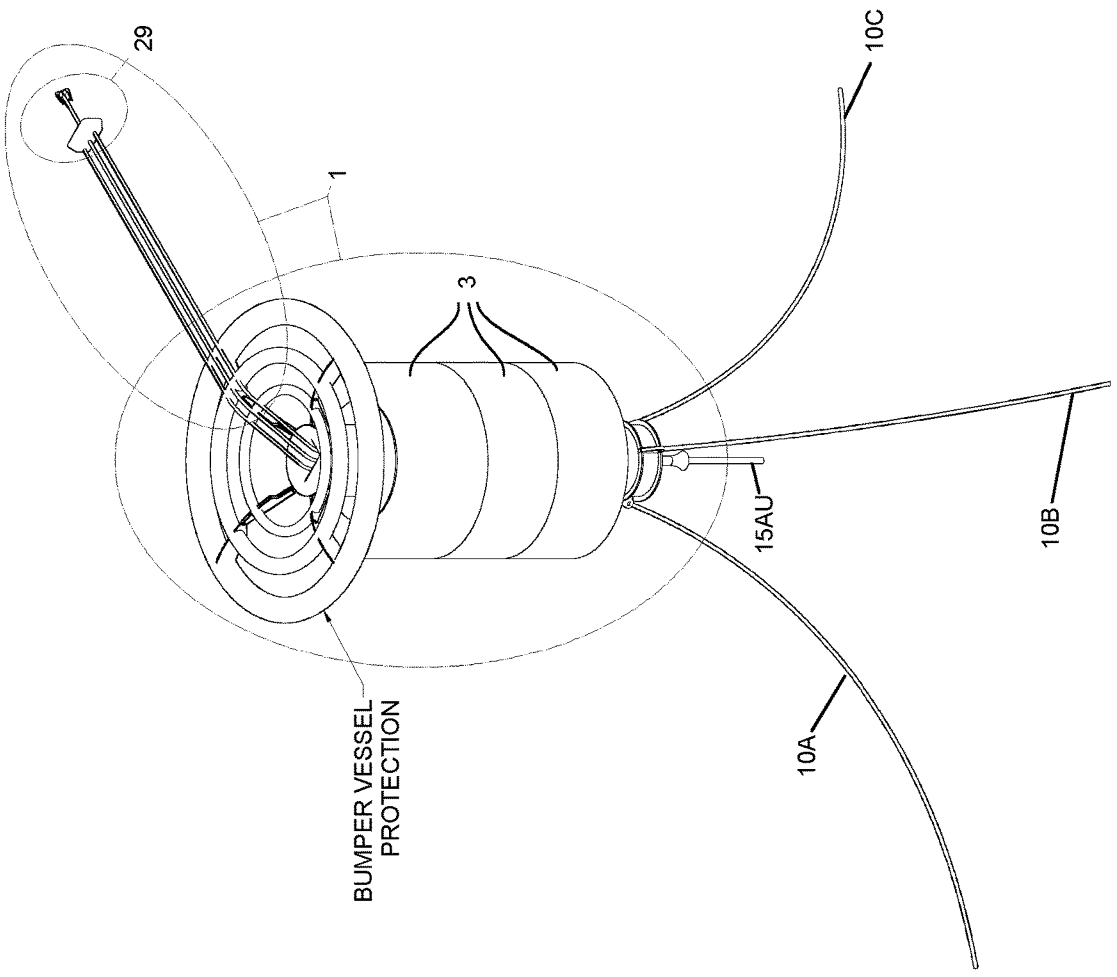
FIG. 2 is a closer more detailed perspective view of the power buoy of FIG. 1, prior to a suitable marine vessel being moored/electrically coupled thereto.
Figure 4:
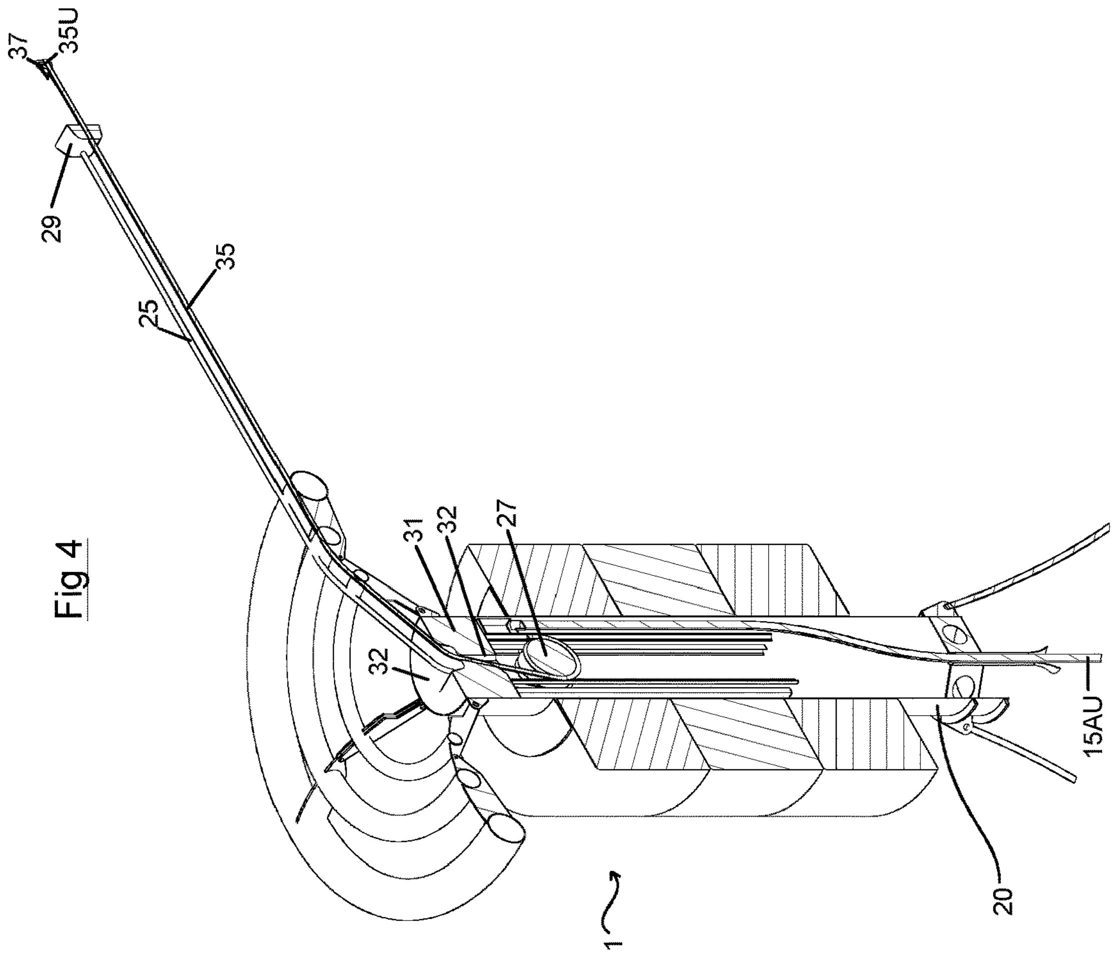
FIG. 4 is a cross sectional perspective view of the power buoy of FIG. 2, but is now shown in a deployed configuration where a suitable marine vessel is in the process of being moored/electrically coupled to the power buoy.
Figure 3:
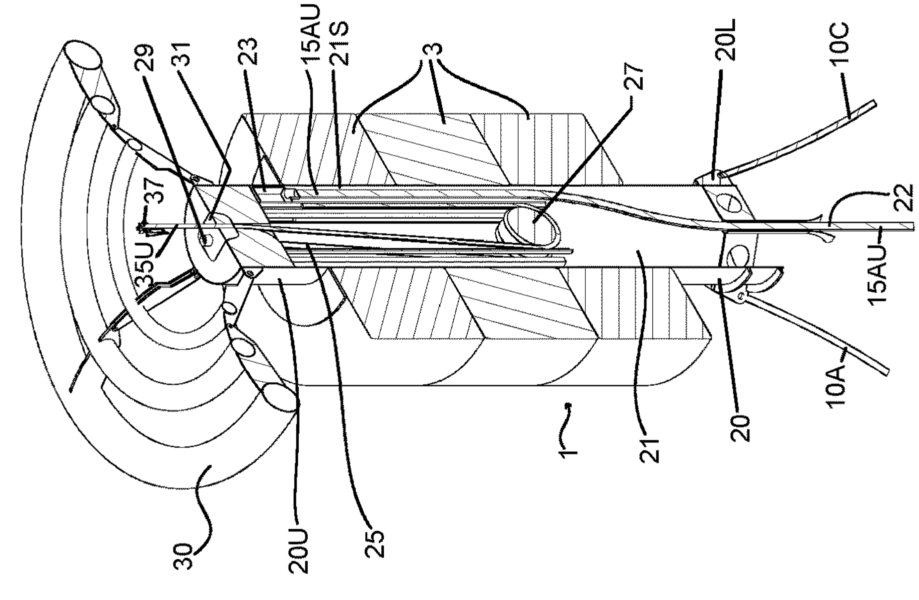
FIG. 3 is a cross sectional perspective view of the power buoy of FIG. 2, prior to a suitable marine vessel being moored/electrically coupled thereto, and in particular showing the parked configuration of the power buoy.
Figure 5:
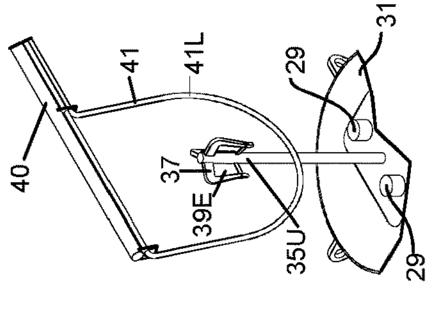
FIG. 5 is a partial perspective view of a mooring lance operated by an operator aboard the suitable marine vessel being moved into a close proximity position with the power head spear of the power buoy of FIG. 3, at the start of a method of mooring and electrically coupling the marine vessel of FIG. 1 to the power buoy of FIG. 1.
Figure 11:
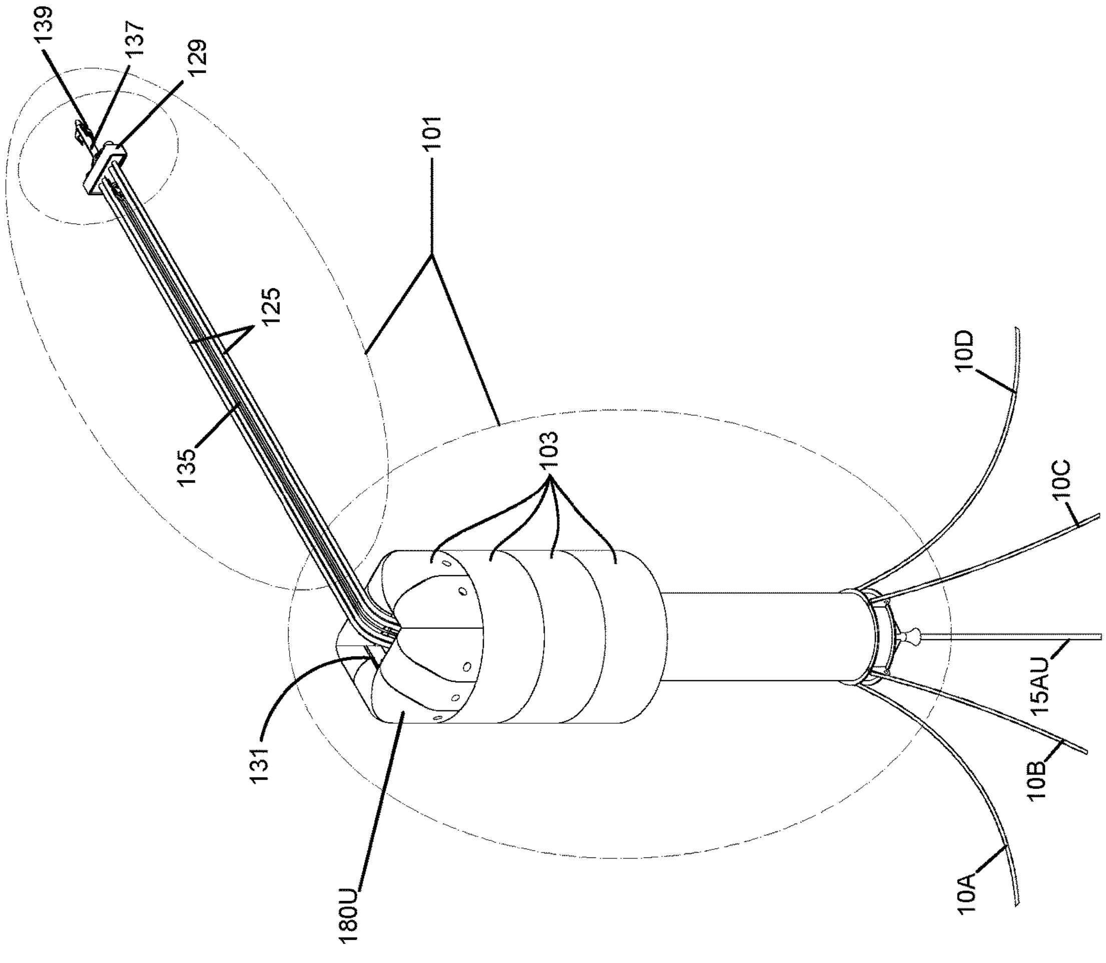
FIG. 11 is a perspective view of a second and preferred embodiment of a power buoy which can be used instead of the power buoy of FIG. 2, prior to a suitable marine vessel being moored/electrically coupled thereto.
Figure 13:
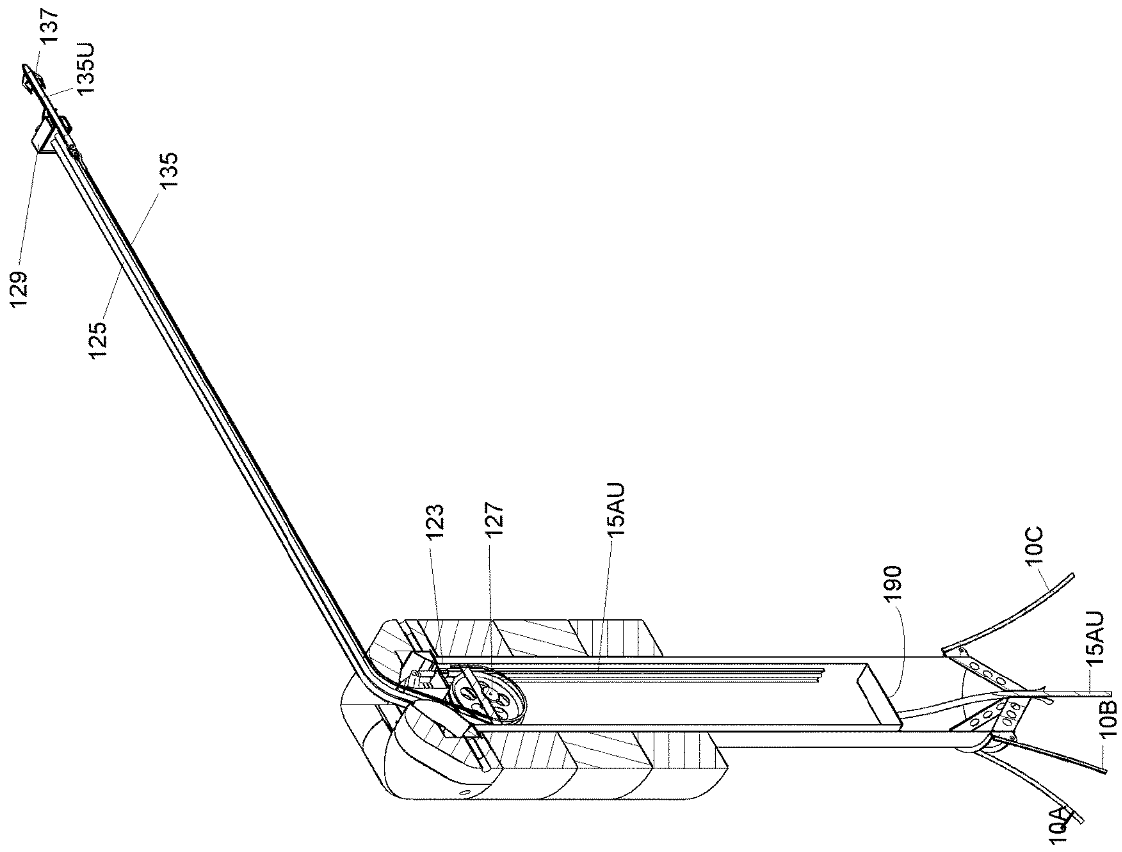
FIG. 13 is a cross sectional perspective view of the power buoy of FIG. 11, but is now shown in a deployed configuration where a suitable marine vessel is in the process of being moored/electrically coupled to the power buoy.
Figure 12:
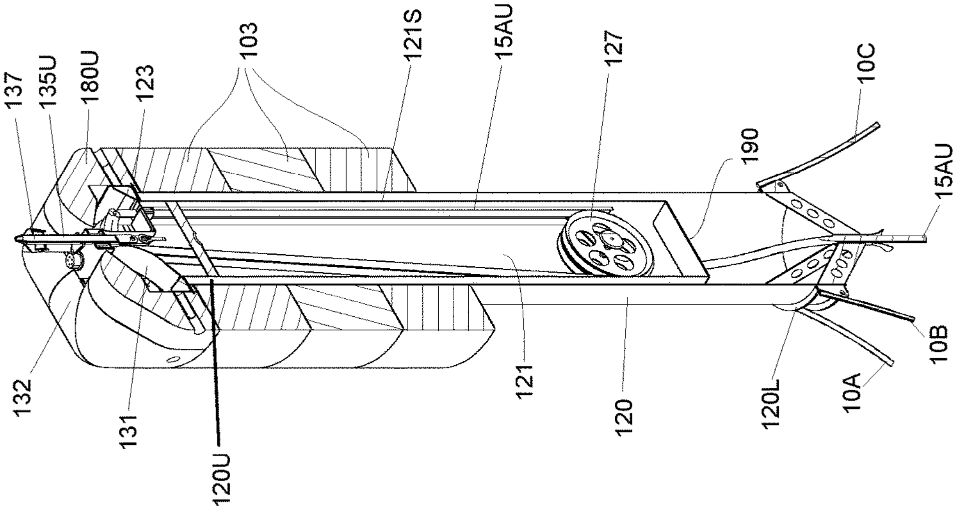
FIG. 12 is a cross sectional perspective view of the preferred power buoy of FIG. 11, prior to a suitable marine vessel being moored/electrically coupled thereto, and in particular showing the parked configuration of the power buoy.

FIG. 1 shows a first embodiment of a marine environment electrical connection apparatus in accordance with the present invention, in the preferred form of a power buoy apparatus 1 and which is shown as being located in a body of water 2 such an ocean or sea and which is moored or anchored to the sea bed 2B via a mooring spread 10 having anchor lines 10A, 10B, 10C (see FIG. 2) and preferably a fourth anchor line 10D (not shown in FIGS. 1 to 4 but shown in FIGS. 11-13 in relation to the preferred second embodiment of the power buoy apparatus 101).

The power buoy 1 is provided with one or more outer annular rings of buoyant material 3 which comprises suitable buoyant material such as foam etc. Indeed, sufficient buoyant material 3 is provided around the outer circumference of the power buoy 1 to enable the power buoy 1 to be substantially upright whilst being located in the body of water 2 and furthermore is preferably arranged such that a substantial portion of the power buoy 1 projects upwardly out of the body of water through the surface of the water 2A. Indeed, the power buoy 1 is designed to float on the surface 2A (i.e the water line 2A) of a body of water 2 and this is achieved by the buoyant material 3 being lighter than water 2 but heavier than air such that the combined mass of the power buoy 1 is lighter than its displacement in water 2. The power buoy 1 floats (when under no or only minimal load) in a substantially vertical orientation such that its vertical dimension is typically greater than its horizontal dimension.

The power buoy 1 further comprises a body or spine 20 which is preferably substantially tubular in shape and which is substantially hollow and which extends along a longitudinal axis which in use is arranged to be substantially parallel to the vertical axis. As can be best seen in FIG. 3 and FIG. 4, the buoyant material annular rings 3 are arranged and secured to the outer circumference of the spine 20 and which extend along the majority of the length of the spine 20 from its mid-point toward each end (i.e. toward the upper end 20U and the lower end 20L) but the buoyant material preferably does not surround the very ends of the upper 20U and lower 20L ends of the spine 20.

A bumper vessel protection ring or series of rings 30 is provided around the upper end of the spine 20 and, preferably, the bumper vessel protection outer ring 30 is arranged to have a greater diameter than the outer most diameter of the buoyant material 3, such that the outer ring of the bumper vessel protection ring 30 will act to protect the power buoy 1 in that it will bear the brunt of the collision or contact from a marine vessel 5 when a marine vessel 5 comes into close proximity or touching proximity of the power buoy 1.

Each of the upper ends 20U of the anchor lines 10A, 10B, and 10C are attached to the lower end 20L of the spine 20 in a secure manner. Accordingly, with the spine 20 being orientated in use substantially vertically, particularly when under no or only minimum load, and because it is supported directly by the buoyant material 3 provided around its outer subconference, the spine 20 will typically pierce through and project upwards from the surface of the water 2A with its upper end 20U being located above the surface of the water 2A and the lower end 20L being located in use below the surface of the water 20A such that, when under no or only minimal load, the longitudinal axis of the spine 20 is substantially perpendicularly arranged relatively to the plane of the surface 2A of the body of water 2. However, it should be noted that when load is applied to the upper end 20U of the power buoy 1 in use (as will be described subsequently) it will likely lean over and under extreme load could lean over to for example in the region of 45 or even 60 degrees or so from the vertical (i.e. the longitudinal axis of the spine 2 may be more horizontal than vertical in use when under load).

However, because the lower end 20L of the spine 20 is securely coupled to the upper ends of the anchor lines 10A, 10B and 10C which are arranged in a mooring spread 10, the power buoy 1 will in use be confined to a generally specific location in the body of water 2 and as such will only have relatively minimal drift away from that generally specific location. That said, the power buoy 1 will be subject to the normal motions of waves.

The power buoy 1 and its mooring spread 10 are located in the body of water 2 in the general vicinity of an electrical energy supply such as that provided by one or more offshore wind turbines which form part of an offshore wind farm 50. The wind farm 50 when installed would have been provided with an electrical power export cable 15B which is run along the seabed 2B and which is provided with an electrical power junction box 16 to permit further electrical power cables (such as 15A) to be connected thereto.

The power buoy 1 is itself provided with an electrical power cable 15A which connects (at its lower most end) into the electrical power junction box 16 in order that the power buoy can be provided with electrical power from the offshore wind farm 50. The electrical power cable 15A rises up from the electrical power junction box 16 toward the power buoy 1, possibly going over or through a subsea arch 15C (which supports and carries the bulk or a significant part of the weight of the electrical power cable 15A) and the upper most end of the electrical power cable 15A enters the inner throughbore 21 of the spine 20 via a cable guide 22 provided at the lower end 20L of the spine 20.

The upper most end 15AU of the electrical power cable 15A is physically terminated and secured to one side of an electrical junction box 23 provided on the inner surface 21S of the inner through bore 21 of the spine 20, such that that physical termination provided by the electrical junction box 23 takes and supports the rest of the weight of the electrical power cable 15A between the power buoy 1 and the subsea arch 15C. The upper most end 15AU of the electrical power cable 15A is connected to suitable electrical connections such as suitable electrically conductive power connectors formed from copper etc. within the electrical junction box 23.

Accordingly, the electrical junction box 23 both physically takes and bears the weight of the upper end 15AU of the electrical power cable 15A and also electrically connects with the upper end 15AU of the electrical power cable 15A in order to be able to transfer the electricity supplied from the electrical power cable 15AU into a flexible electrical cable 25 when required to do so in order to recharge the batteries on a marine vessel 5 coupled thereto, as will be subsequently described. Alternatively, and preferably, a cable clamp is provided to take the physical weight and therefore load of the upper end 15AU of the electrical power cable 15A whilst the electrical junction box 23 physically takes (but doesn't require to bear the weight of the upper end 15AU of the electrical power cable 15A).

At least one flexible electrical cable 25 (but preferably multiples of 2 e.g. a number, 2, 4, 6 or more etc.) of flexible electrical cables 25 are provided within the inner throughbore 20 and have one end electrically and physically secured within the other side of the electrical junction box 23 (and are therefore electrically connected to electrical power supplied from the electrical power cable 15A). The flexible electrical cables 25 then run downwards within one side of the inner throughbore 20, curve around approximately 180 to 185 degrees (such as in the region of 182 degrees or so) of the outer circumference of a travelling mass 27 and then are run back up the other side of the inner through bore 21 of the body or spine 20 until the other end of the flexible electrical cables 25 are terminated in a power socket 29. The power socket 29 sits within a recess 32 formed in the outer most end of a power head 31. The power head 31 forms an end closure to the upper most end 20U of the spine 20, and is provided with an aperture 32 formed through its centre such that the flexible electrical cable 25 and a buoy mooring line 35 can be pulled outwardly from and/or pulled back into the through bore 21 of the spine 20.

The power socket 29 is secured to the outer surface of the buoy mooring line 35 by for example, being clamped thereto or being integrally formed around the outer circumference of the buoy mooring line 35 in such a manner that when the upper/outer most end 35U of the buoy mooring line 35 is pulled upwards, the buoy mooring line 35 takes all or substantially of the load/tension and thus largely or wholly carries the power socket 29 and thus the flexible electrical cable 25 upwards and outwards. Advantageously, the power socket 29 is provided with suitable sensors which can sense when a connector such as a connector on board a marine vessel 5 is coupled to the power socket 29 or is otherwise inserted into the power socket 29 when on board the marine vessel 5.

Moreover, the power head 31 and/or the power socket 29 is provided with power indicator lights (not shown), where the power indicator lights are illuminated if/when each of the electrical phases carried through the flexible electrical cable 25 are energised, in order to provide an indication means to the operator of the power buoy 1 that the flexible electrical cable is energised.

The buoy mooring line 35 is preferably a high strength, low stretch buoy mooring line 35. One end of the buoy mooring line 35 is secured to the inner surface of the inner though bore 21 of the spine 20 at or toward the upper end 20U thereof. The buoy mooring line (similarly to the flexible electrical cable 25) is run in parallel to the flexible electrical cable 25 such that the buoy mooring line 35 travels downwards from the upper end 20U towards and around approximately 180 to 185 degrees (such as in the region of 182 degrees or so) of the circumference of the travelling mass 27 and then back up the other side of the inner throughbore 21 until it passes through the aperture 32 in the power head 31. The upper end 35U of the buoy mooring line 35 projects upwards out of the aperture and is provided with a power head spear 37 thereon.

Figure 10:
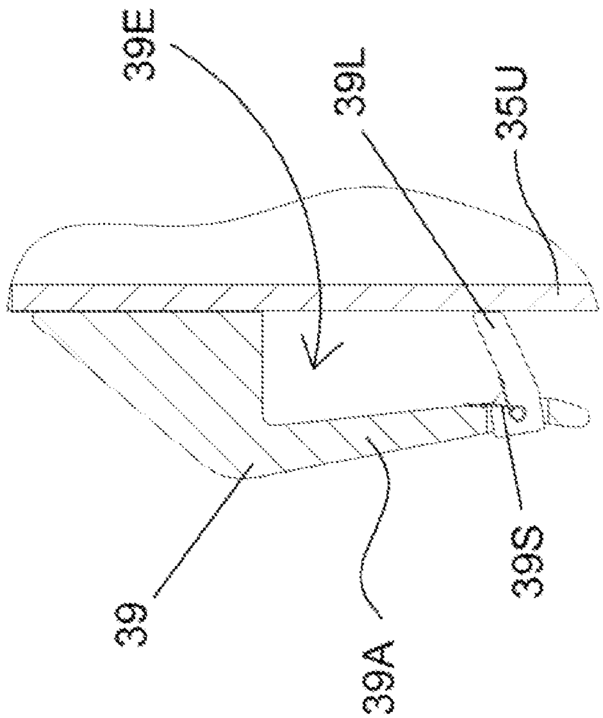
FIG. 10 is a cross sectional side view of the hook of the power head spear of FIG. 9.

The power head spear 37 comprises one or more hooks 39 and in the preferred embodiment shown in the figures (and in particular FIGS. 5 to 8) there are provided three hooks 39 at the upper most end 35U of the flexible mooring line 35, where the three hooks 39 are distributed equally spaced (i.e. at 120 degree intervals) around the outer circumference of the upper end 35U. As can most be clearly seen in FIGS. 9 and 10, each hook 39 preferably comprises an outwardly and downwardly projecting hook arm 39A which is spaced apart from the upper end 35U in order to create a hook eye 39E into which can be captured a vessel mooring line 41 (see FIGS. 6, 7 and 8). The vessel mooring line 41 can pass into the hook eye 39E by means of moving open a latch 39L which is biased into a closed configuration as shown in FIG. 10 by a hook spring 39S such that the latch 39L closes the hook eye 39E and therefore once the vessel mooring line 41 is trapped within the hook eye 39E, the latch 39L shuts into the closed configuration shown in FIG. 10 and thus prevents the vessel mooring line 41 from escaping from the hook eye 39E unless and until the operator releases the bitter end of the vessel mooring line 41 and pulls it through the hook eyes 39E disconnect the vessel mooring line 41 from the hook eyes 39E. The biased latch 39L by means of the spring 39S provides a very effective means for an operator to catch and trap the vessel mooring line 41 into the hook eye 39E.

Figure 8:
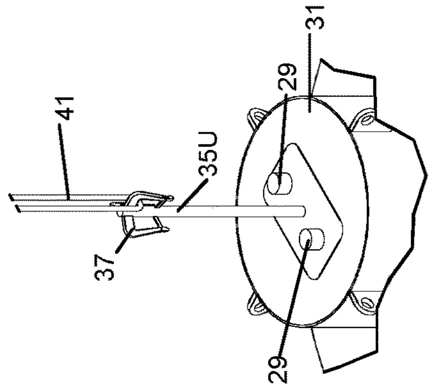
FIG. 8 is a partial perspective view one stage on from that shown in FIG. 7, where the mooring line has been pulled taught by the operator aboard the marine vessel, but prior to the operator pulling the power head spear and thus the power socket aboard the marine vessel.
Figure 9:
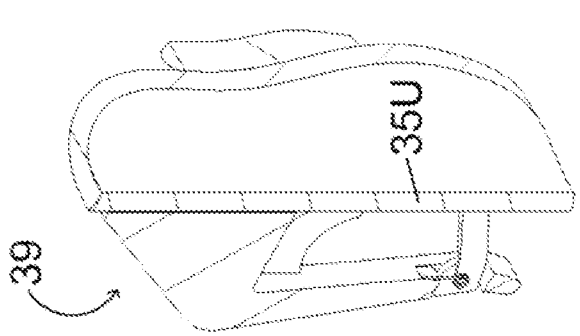
FIG. 9 is a partial perspective cross section of one hook of the power head spear of the power buoy of FIG. 3.

In addition, on the marine vessel 5 having the electricity storage means such as batteries (not shown) to be recharged by the power buoy 1, a mooring lance 40 is provided to aide coupling of the vessel mooring line 41 to the power head spear 37. The mooring lance 40 comprises a relatively long and preferably lightweight pole 40, where a number of selectively openable opening eyes 42 are attached. The opening eyes 42 can be selectively operated from the operator end (not shown) of the mooring lance 40 by the operator, where the opening eyes 42 are shown in the closed configuration in FIG. 5 and FIG. 6 whereby the opening eyes 42 have captured the vessel mooring line 41 and thus the operator can guide the mooring lance 40 and thus the vessel mooring line 41 and in particular the bight or looped far end 41L into the hook eyes 39E of the power head spear 37, and once the looped end 41L is captured within at least one of the hook eye(s) 39E, the operator can selectively open the opening eyes 42 to release the mooring lance 40 from engagement with the vessel mooring line 41 and thus the vessel mooring line 41 can be pulled upwards and/or away from the buoy 1 as shown in FIG. 8 and thus the operator can pull upon the vessel mooring line 41 to pull both it and importantly pull the power head spear 37 and thus the power socket 29 toward and onto the vessel 5 (as shown in FIG. 1) and the operator can then connect the power socket 29 to a suitable connector such as a power plug (not shown) provided on the mooring vessel 5 and can thus draw electric power from the wind farm 50 via the electric power cable 15B, the electrical powered junction box 16, the electrical power cable 15A, the electrical junction box 23, the flexible electrical cable 25 and the power socket 29 in order to recharge the batteries provided on the marine vessel 5.

In operation, a vessel crew member will thread the vessel mooring line 41 thorough the opening eyes 42 of the mooring lance 40, leaving a bight or end loop 41L at the far end thereof. The operator will make fast the other end of the vessel mooring line 41 to the mooring line provided on the marine vessel 5.

Figure 6:
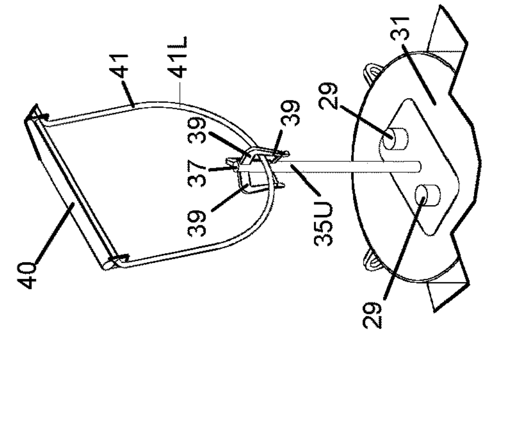
FIG. 6 is a partial perspective view of the mooring lance of FIG. 5, but where the mooring lance is one step on from that shown in FIG. 5, and where the vessel mooring line is now shown as having been engaged with the power head spear of the power buoy.

The operator will then slowly approach the power buoy 1 on the marine vessel 5 and once the marine vessel 5 is within range of the power buoy 1 (see FIG. 5), the crew member, using the marine lance 40, will draw up the vessel mooring line bight 41L over the power head spear 37 and engage the bight 41L into at least one of the hook eyes 39E (see FIG. 6).

Figure 7:
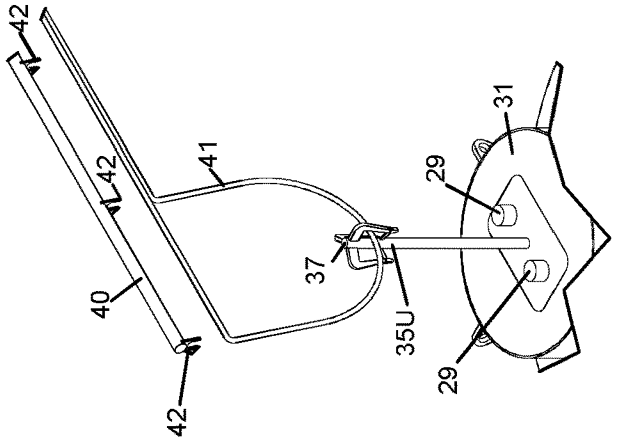
FIG. 7 shows the next stage of the mooring and electrical connection of a suitable marine vessel to the power buoy on from the previous stage shown in FIG. 6, where the mooring lance has now been detached from the mooring line.

The operator will then open the opening eyes 42 of the mooring lance 40 which allows the vessel mooring line 41 to drop free of the mooring lance 40 (see FIG. 7). The operator will then set aside the mooring lance 40 and the free end of the vessel mooring line 41 is then pulled by the operator (see FIG. 8) in and on to the marine vessel 5 using the marine vessel's windlass (not shown).

As the vessel mooring line 41 tightens, it will move up the power head spear 37 and will enter one of the hook eyes 39E, the sprung latch 39L closing behind it. There is now a captive connection between the mooring vessel 5 and the power buoy 1.

The operator will continue to pull in the vessel mooring line 41 and the power socket 29 will lift off the top of the power head 31 and will travel across the gap between the power buoy 1 and the marine vessel 5.

At all times, the physical forces (i.e. load/tension) will be borne by the mooring lines 41/35 and not the flexible electrical cable 25 which only requires to support its own self weight. Additionally, the present invention has the advantage that crew members/operators are not subject to any mooring forces.

Once the power socket 29 is located on the floor deck of the marine vessel 5, the vessel mooring line 41 can be secured by the operator and the power socket 29 can be restrained in position.

Electrical connection can then be made up between the power socket 29 and the suitable plug which will engage with the power socket 29.

Another embodiment has the power head 31 pulled onto the deck of the vessel 5 by the vessel windlass (not shown) and due to both guides coarse and precision mechanical guides, the power head 31 automatically locates into a female receptacle (not shown) on the vessel 5 deck. As part of this connection, the electrical connections are also made up.

Once physical electrical connection has been made, the control system will sense that the physical connection has been made via the appropriate sensors that have been provided with the power buoy 1 and the control system will send an appropriate telemetry signal to the electrical source (such as the electrical power junction box 16) and the electrical power cable 15A can be energised.

The electrical power storage means such as the batteries provided on the marine vessel 5 can then be recharged. Once fully or sufficiently recharged (thus providing the marine vessel with significant additional maritime range), the operator can instruct the control system to send a telemetry signal to power down the electrical supply to the electrical power junction box 16. The operator can then remove the electrical connector such as the plug provided on the marine vessel 5 from its physical and electrical connection with the power socket 29.

The operator can then release one end of the vessel mooring line 41 and the vessel mooring line 41 can then be pulled through the hook eye 39E of the power head spear 37.

Because the traveling mass 27 has been released of load, the travelling mass 27 will start to move or fall downwards inside the spine 20 within the power buoy 1 and in doing so will pull in the buoy mooring line 35, the flexible electrical cables 25 and the power socket 29. The power socket 29 will self-locate within the recess 32 of the power head 31 and thus the power socket 29 will self-locate in its parked position.

FIG. 11 shows a second and more preferred embodiment of a marine environment electrical connection apparatus in accordance with the present invention, in the preferred form of a power buoy apparatus 101 and which is shown as being located in a body of water 2 such as an ocean or sea and which is moored or anchored to the sea bed 2B via a mooring spread 10 having anchor lines 10A, 10B, 10C (see FIG. 2) and preferably a fourth anchor line 10D (not shown in FIGS. 1 to 4 but shown in FIGS. 11-13).

The second and more preferred embodiment power buoy apparatus 101 is in many ways very similar to the first embodiment of power buoy apparatus 1 hereinbefore described, and therefore, like components therebetween are indicated by using the same reference numeral as the first embodiment of power buoy apparatus 1 hereinbefore described but with the addition of 100. Such like components are however not further described herein for the sake of brevity but rather the main differences therebetween will now be discussed.

The power buoy 101 as shown in FIG. 11 comprises a different upper end to the power buoy 1, in that it foregoes the bumper rings 30 of the power buoy 1 and instead has the foam cored buoyancy 103 extending further upwards which incorporates the power head 131 therein and is also shaped with a rounded upper end 180U to provide the same support and protection to both the power head 131 as the bumper rings 30.

In addition, the power buoy 101 comprises a cable clamp 190 which takes the physical weight and therefore load of the upper end 15AU of the electrical power cable 15A whilst the electrical junction box 123 physically takes (but doesn't require to bear the weight of the upper end 15AU of the electrical power cable 15A) in the power buoy 101. The electrical junction box 123 therefore electrically connects with the upper end 15AU of the electrical power cable 15A in order to be able to transfer the electricity supplied from the electrical power cable 15AU into the flexible electrical cable 125 when required to do so in order to recharge the batteries on a marine vessel 5 coupled thereto in a similar manner to that of the power buoy 1. Otherwise, the power buoy 101 is operated and operates in a similar manner to the power buoy 1.

FIG. 14 shows a third embodiment of a marine environment electrical connection apparatus in accordance with the present invention, in the form a power buoy apparatus 201 and which is shown as being located in a body of water 2 such as an ocean or sea and moored via a mooring spread 10 having anchor lines 10A, 10B, 10C (not shown in FIG. 14 but shown in FIG. 2) and preferably a fourth anchor line 10D (not shown in FIGS. 1-4 and FIG. 14 but shown in FIGS. 11-13).

The third embodiment of power buoy apparatus 201 is in many ways very similar to the first and/or second embodiments of the power buoy apparatus 1, 101 hereinbefore described, and therefore, like components therebetween are indicated by using the same reference numeral as the first embodiment of power buoy apparatus 1 hereinbefore described but with the addition of 200 (compared with the first embodiment). Such like components are however not further described herein for the sake of brevity but rather the main differences will now be discussed.

Like in the second embodiment of the power buoy apparatus 101, the power buoy 201 as shown in FIG. 14 comprises a different upper end to the power buoy 1, in that it forgoes the bumper rings 30 of the power buoy 1 and instead has the foam based buoyancy 203 extending further upwards which incorporates the power head 231 in order to provide the same support and protection to the power head 231 as the bumper rings 30, but unlike the second embodiment of the power buoy apparatus 101, the foam based buoyancy as shown in FIG. 14 is shaped with a tapered upper end 281 (the taper of the walls 282 of the upper end 281 being angled inwards from the lower end towards the upper end 281 with the shape of the said walls 282 taking the shape of a frusto-conical shape such that the very upper end 281 has a flat upper end 283 with the power head 231 extending upwardly therefrom when it is in the rest configuration as shown in FIG. 15) and which as will be described in more detail below, the tapered upper end 281 will guide the vessel mooring line 241 towards the power head spear 237 of the power buoy apparatus 201 as the vessel mooring line 241 is pulled towards the suitable marine vessel 205.

In addition, the third embodiment of the power buoy apparatus 201 is preferably much larger than the previous embodiments of the power buoy apparatus 1,101 as the third embodiment 201 is intended to be used in a marine environment electrical connection apparatus wherein the suitable marine vessel 205 is much larger than that of the previous embodiments; for example, the marine vessel 205 may be a relatively large vessel 205 such as an offshore supply vessel, a tanker, container transport ship or cruise ship etc.

In operation of the third embodiment of the power buoy apparatus 201, a crane 245 aboard the marine vessel 205 will be controlled by a crew member. The crane 245 will be loaded with a vessel mooring line 241. The operator will then slowly approach the power buoy 201 on the marine vessel 205 and once the marine vessel 205 is within range of the power buoy 201, the crane 245 will release the vessel mooring line 241 such that the power buoy 201 is surrounded by a bight 241L of the vessel mooring line 241 (see FIG. 15)

The crane operator will then start pulling the vessel mooring line 241 in towards the marine vessel 205 using a windlass 246 aboard the marine vessel 205. The vessel mooring line 205 will engage with the outer surface of the power buoy apparatus 201, likely around the relatively wide outer circumference thereof at sea level, from which the vessel mooring line 241 will start riding up the body (and in particular the inwardly tapering walls 282) of the power buoy apparatus 201. The tapered upper end 281 of the power buoy 201, particularly as it transitions to the flat upper end 283, therefore guides the vessel mooring line 241 towards the upwardly extending power head 231 (see FIG. 16)

As the vessel mooring line 241 is pulled towards the marine vessel 205, it will reach the top end or the flat upper end 283 of the buoyant material 203, from which it will disengage therefrom and then transition into engagement with the power head spear 237. As the vessel mooring line is pulled further, it will engage with at least one of the hook eyes 239E, the sprung latch 239L thereof closing it behind. There is now a captive connection between the marine vessel 205 and the power buoy 205 (see. FIG. 17).

From this point in the operation, the procedures involved in pulling the power socket 229 aboard the suitable marine vessel 205 and making the electrical connection between the power socket 229 and the suitable plug are the same as described in previous embodiments (see FIG. 18 and FIG. 19).

Embodiments of the present invention have the significant advantage that all of the internal mooring lines 35, 135, 235 and flexible electrical cables 25, 125, 225 are held in controlled tension (by means of the travelling mass 27, 127, 227) and thus are prevented from flailing about and getting damaged within the through bore 21, 121, 221 of the spine 20, 120, 220 when in the parked position. In addition, the inclusion of the travelling mass 27, 127, 227 arrangement and the winding of the internal mooring lines 35, 135, 235 and flexible electrical cables 25, 125, 225 there around and/or the internal mooring lines 35, 135, 235 and flexible electrical cables 25, 125, 225 being secured at or towards the upper end of the through bore 21, 121, 221 of the spine 20, 120, 220 provides the great advantage that a multiple of the length of the travelable distance of the travelling mass member 27, 127, 227 can be pulled out of the uppermost end of the buoy 1, 101, 201 (i.e. the length of the internal mooring lines 35, 135, 235 and flexible electrical cables 25, 125, 225 that can be pulled out is twice (or more depending upon the configuration of the travelling mass member 27, 127, 227) the length of the movement of the travelling mass member 27, 127, 227.

Modifications and improvements can be made to the embodiments hereinbefore described without departing from the scope of the invention. For example, the arrangement and/or provision of the travelling mass member 27, 127, 227 and the winding of the internal mooring lines 35, 135, 235 and flexible electrical cables 25, 125, 225 there around can be modified (e.g. into a multiple pulley arrangement and/or a reel arrangement (not shown) where the internal mooring lines 35, 135, 235 and flexible electrical cables 25, 125, 225 are wound around a reel instead) to allow for greater multiple of the said length of travel.

The invention claimed is:

1. A marine environment electrical connection apparatus comprising:

a buoy at least part of which when located in water projects above the surface of the water;

at least one mooring point to which a marine vessel can be coupled; and at least one electrical power coupling to which the marine vessel can be coupled, such that electrical power can be transferred via the electrical power coupling between a power generation and/or storage device and the marine vessel;

wherein the mooring point comprises a mooring line, with a first end connected to the buoy and a second end provided with a connector adapted for connection to a vessel mooring line;

wherein the electrical power coupling comprises a flexible electrical cable, one end of which is secured to the buoy and another end of which comprises one of a plug and socket adapted for electrical connection with one of a respective mating socket and plug on the marine vessel;

wherein the buoy has a body which is adapted to permit paying of the mooring line and the flexible electrical cable away from and toward a portion of the body;

wherein the mooring line and the flexible electrical cable pay in and out from the body, such that the buoy apparatus is transformable between:

a rest configuration in which the respective free ends of the mooring line and the flexible electrical cable are relatively close to the body and are presented in a position that is clear of the water, in use, and a deployed configuration in which the respective free ends of the mooring line and the flexible electrical cable are payed out from the body such that the respective free ends are capable of being made fast to the vessel;

wherein the mooring line and the flexible electrical cable are jointly biased into the rest configuration by a biasing means; and wherein the biasing means comprises a travelling mass member.

2. Apparatus as claimed in claim 1, wherein the body comprises an internal bore.

3. Apparatus as claimed in claim 2, wherein the mooring line and the flexible electrical cable pay in and out from the body, such that the buoy apparatus is transformable between:

a rest configuration in which the respective free ends of the mooring line and the flexible electrical cable are relatively close to the body and are presented in a position that is clear of the water, in use; and a deployed configuration in which the respective free ends of the mooring line and the flexible electrical cable are payed out from the body such that the respective free ends are capable of being made fast to the vessel, wherein the mooring line and the flexible electrical cable are jointly biased into the rest configuration by a biasing means;

wherein the biasing means comprises a travelling mass member, and wherein one end of the mooring line and the flexible electrical cable are secured to the body and a respective middle portion of the mooring line and the flexible electrical cable are arranged around the outer circumference of the travelling mass member, and the moveable mass member is located within the internal bore of the body.

4. Apparatus as claimed in claim 3, which further comprises of an electrical power cable arranged to connect to one of a power generation and power storage device at one end and to the said one end of the flexible electrical cable at an other end.

5. Apparatus as claimed in claim 4, wherein the electrical power cable is arranged to enter the body through the internal bore at a lower end of the body.

6. Apparatus as claimed in claim 5, wherein the electrical power cable is connected to the said one end of the flexible electrical cable at a connection point located towards or at an upper end of the body.

7. Apparatus as claimed in claim 6, wherein the electrical power cable is connected to the flexible electrical cable within the internal bore of the body.

8. Apparatus as claimed in claim 7, wherein the flexible electrical cable is secured at or towards the upper end of the body to allow for a length of flexible electrical cable approximate to twice the travelable distance of the travelling mass member to be pulled out of an uppermost end of the buoy.

9. Apparatus as claimed in claim 2, wherein the travelling mass member jointly pulls the middle portion of the mooring line and the flexible electrical cable towards the rest configuration by virtue of gravity acting upon the moveable mass member to bias the moveable mass member to the lower end of the body and therefore to bias the respective other ends of the mooring line and the flexible electrical cable towards and/or retain it in the rest configuration.

10. Apparatus as claimed in claim 1, wherein the buoy comprises a flotation member in the form of buoyant material provided on an outer surface of the body.

11. Apparatus as claimed in claim 10, wherein the buoyant material is adapted to assist in the flotation of the buoy such that at least a portion of the buoy projects out the water.

12. Apparatus as claimed in claim 1, wherein the buoy is arranged such that the said free end of at least one of the mooring line and the flexible electrical cable is arranged to project out of the water in use of the buoy.

13. Apparatus as claimed in claim 1, wherein the flexible electrical cable is secured to the mooring line at least at one location along its length.

14. Apparatus as claimed in claim 13, wherein the flexible electrical cable is secured to the mooring line towards the said other end of the flexible electrical cable such that the mooring line bears the majority of the tension experienced when the marine vessel is moored to the buoy.

15. Apparatus as claimed in claim 1, wherein the buoy comprises an attachment point that provides for the attachment of a restraint.

16. Apparatus as claimed in claim 15, wherein the restraint comprises of a connection between the buoy and the sea bed.

17. Apparatus as claimed in claim 1, wherein the marine vessel comprises a control system for controlling the recharging of the electrical power storage means.

18. Apparatus as claimed in claim 17, wherein the buoy comprises one or more sensors adapted to communicate to the control system on the marine vessel when the electrical connector of the electrical power coupling is in electrical connection with a suitable electrical connector provided on the marine vessel.

19. Apparatus as claimed in claim 1, wherein the other end of the mooring line is available to be picked up by an operator of a marine vessel from a pick up position, such that the operator can make the other end fast to the vessel in use in order to moor the vessel.

20. Apparatus as claimed in claim 19, wherein the pick up position of the other end of the mooring line is above the water level.

21. Apparatus as claimed in claim 1, wherein the body comprises an internal bore and the body is adapted to contain a greater length of the mooring line and the flexible electrical cable than the length of the internal bore when the buoy apparatus is in the rest configuration.

22. A method of electrically recharging a marine vessel, the method comprising the steps of:

connecting a marine vessel to a marine environment electrical connection apparatus, the apparatus comprising a buoy at least part of which when located in water projects above the surface of the water;

at least one mooring point to which a marine vessel can be coupled; and at least one electrical power coupling to which the marine vessel can be coupled, such that electrical power can be transferred via the electrical power coupling between a power generation and/or storage device and the marine vessel;

wherein the mooring point comprises a mooring line, with a first end connected to the buoy and a second end provided with a connector adapted for connection to a vessel mooring line;

wherein the electrical power coupling comprises a flexible electrical cable, one end of which is secured to the buoy and another end of which comprises one of a plug and socket adapted for electrical connection with one of a respective mating socket and plug on the marine vessel;

wherein the buoy has a body which is adapted to permit paying of the mooring line and the flexible electrical cable away from and toward a portion of the body;

wherein the mooring line and the flexible electrical cable pay in and out from the body, such that the buoy apparatus is transformable between:

a rest configuration in which the respective free ends of the mooring line and the flexible electrical cable are relatively close to the body and are presented in a position that is clear of the water, in use, and a deployed configuration in which the respective free ends of the mooring line and the flexible electrical cable are payed out from the body such that the respective free ends are capable of being made fast to the vessel;

wherein the mooring line and the flexible electrical cable are jointly biased into the rest configuration by a biasing means; and wherein the biasing means comprises a travelling mass member; and transferring electrical power via the electrical power coupling between a marine power generation and/or marine storage device and the marine vessel.

23. A method claimed in claim 22 further comprising:

connecting a vessel mooring line provided on a vessel to the said at least one mooring point; and pulling the vessel mooring line towards the vessel to bring at least a portion of the marine environment electrical connection apparatus aboard the vessel.

24. A method of connecting a marine vessel to a marine environment connection apparatus, the method comprising the steps of:

providing a marine environment connection apparatus comprising:

a buoy at least part of which when located in water projects above the surface of the water;

at least one mooring point to which a marine vessel can be coupled;

surrounding the buoy with a bight of a vessel mooring line provided on the marine vessel;

pulling in the vessel mooring line such that the vessel mooring line engages with an outer surface of the buoy, from which the vessel mooring line rides up a body of the buoy; and connecting the vessel mooring line to the said at least one mooring point, wherein the vessel mooring line rides up inwardly tapering walls of the body of the buoy; and wherein the vessel mooring line transitions to a flat upper end of the body of the buoy, guiding the vessel mooring line to the at least one mooring point.

25. The method of claim 24 wherein connecting the vessel mooring line to the said at least one mooring point comprises capturing the vessel mooring line within a hook of a connection means of the at least one mooring point.

26. The method of claim 25 wherein capturing the vessel mooring line within the hook of the connection means of the at least one mooring point comprises moving open a latch of the connection means from a biased closed configuration.

27. The method of claim 24 further comprising the step of:

pulling the vessel mooring line towards the marine vessel to bring at least a portion of the mooring point aboard the marine vessel.

28. The method of claim 27, wherein the mooring point comprises a mooring line, with a first end connected to the buoy and a second end provided with a connection means adapted for connection to the vessel mooring line;

wherein the buoy has a body which is adapted to permit paying of the mooring line away from and toward a portion of the body;

wherein the method comprises providing the marine connection apparatus in a rest configuration in which the second end of the mooring line is relatively close to the body and presented in a position that is clear of the water;

connecting the vessel mooring line to the connection means of the mooring line; and pulling the vessel mooring line towards to marine vessel to bring the marine connection apparatus into a deployed configuration in which the second end of the mooring line is payed out from the body and the second end of the mooring line is pulled aboard and is connected to the marine vessel.

* * * * *